US006481634B1

(12) United States Patent
Zosimadis (10) Patent No.: US 6,481,634 B1
(45) Date of Patent: Nov. 19, 2002

(54) FLUID DATA MONITORING AND CONTROL SYSTEM (75) Inventor: Peter Zosimadis, Etobicoke (CA)

(73) Assignee: Smart Wave Technologies Inc., Toronto (CA)

(*) Notice: Subject to any disclaimer, the term of this patent is extended or adjusted under 35 U.S.C. 154(b) by 0 days.

(21) Appl. No.: 09/582,684
(22) PCT Filed: Dec. 23, 1998
(86) PCT No.: PCT/CA98/01199
§ 371 (c)(1),
(2), (4) Date: Jun. 29, 2000
(87) PCT Pub. No.: WO99/34065
PCT Pub. Date: Jul. 8, 1999

Related U.S. Application Data (63) Continuation of application No. 08/998,576, filed on Dec. 29, 1997, now Pat. No. 6,059,192, which is a continuation-in-part of application No. 08/628,320, filed on Apr. 4, 1996, now Pat. No. 5,845,844.

(51) Int. Cl.[7] .............................. E03C 1/05; F16K 31/02
(52) U.S. Cl. ........................ 236/12.12; 4/623; 236/94; 251/129.04
(58) Field of Search .................... 4/623; 236/12.12, 236/51, 94, 93 B; 251/129.04

(56) References Cited

U.S. PATENT DOCUMENTS

| 4,256,258 A | 3/1981 | Sekiya ........................ 236/94 |
| 4,700,884 A | 10/1987 | Barrett et al. ............. 236/12.12 |
| 4,735,357 A | 4/1988 | Gregory et al. ........... 236/93 R |
| 4,756,030 A | 7/1988 | Juliver ........................... 4/192 |
| 4,762,429 A | 8/1988 | Fujikawa .................... 374/163 |
| 4,839,039 A | 6/1989 | Parsons et al. ............ 4/623 X |
| 4,886,207 A | 12/1989 | Lee et al. ................. 236/12.12 |
| 4,941,608 A | 7/1990 | Shimizu et al. .......... 236/12.12 |
| 5,050,062 A | 9/1991 | Hass .................... 236/12.12 X |
| 5,184,642 A | 2/1993 | Powell ........................ 137/607 |
| 5,199,790 A | 4/1993 | Pawelzik et al. ........... 274/147 |
| 5,217,035 A | 6/1993 | Van Marcke ............... 4/623 X |
| 5,226,629 A | 7/1993 | Millman et al. ........ 251/129.04 |
| 5,358,177 A | 10/1994 | Cashmore ................. 236/12.12 |
| 5,400,961 A | 3/1995 | Tsutsui et al. ............ 236/12.12 |
| 5,449,112 A | 9/1995 | Heitman et al. .......... 236/51 X |
| 5,476,221 A | 12/1995 | Seymour ................... 236/51 X |
| 5,577,660 A | 11/1996 | Hansen ..................... 236/12.12 |
| 5,595,342 A | 1/1997 | McNair et al. ................ 236/51 |
| 5,655,749 A | 8/1997 | Mauerhofer ........... 251/129.04 |
| 5,855,356 A | 1/1999 | Fait ....................... 251/129.04 |
| 5,868,311 A | 2/1999 | Cretu-Petra ............. 236/12.12 |
| 6,059,192 A * | 5/2000 | Zosimadis ................ 236/12.12 |

FOREIGN PATENT DOCUMENTS

| CA | 2090131 | 2/1993 |
| CA | 2128725 | 11/1993 |
| EP | 0 446 953 A2 | 3/1991 |
| EP | 0 175 552 A2 | 9/1995 |
| FR | 2550648 | 8/1984 |
| WO | WO87/05352 | 9/1987 |
| WO | WO 94 00645 A | 1/1994 |
| WO | WO 9405131 A | 3/1994 |
| WO | WO 97 18359 A | 5/1997 |

* cited by examiner

Primary Examiner—William Wayner
(74) Attorney, Agent, or Firm—Heslin Rothenberg Farley & Mesiti P.C.

(57) ABSTRACT

A fluid data monitoring and control system useful in monitoring fluid properties and controlling the flow of that fluid from a faucet is described. The system includes a fluid property sensor/transmitter attached to a faucet which communicates via a wireless link to a controller. The wireless link is utilized to facilitate installation on a faucet. Various embodiments of the system include a system having a user detector for touchless control of the flow of water from a faucet, a digital display with audio and/or visual alarms to indicate if pro-set fluid conditions have been realized, a control valve (20) to moderate flow of water to the faucet and a design to provide the incorporation of multiple sensors into the system.

24 Claims, 9 Drawing Sheets

FLUID DATA MONITORING AND CONTROL SYSTEM

CROSS REFERENCE TO RELATED APPLICATIONS

This application is national phase application under § 371 of PCT/CA98/01199, filed on Dec. 23, 1998, designating the United States and is a continuation of U.S. Ser. No. 08/998,576, filed Dec. 29, 1997, now U.S. Pat. No. 6,059,192, and which is a continuation-in-part of U.S. Ser. No. 08/628,320, filed Apr. 4, 1996, now U.S. Pat. No. 5,845,844, the priorities of both applications are claimed here.

FIELD OF THE INVENTION

A fluid data monitoring and control system useful in monitoring fluid properties and controlling the flow of that fluid from a faucet is described. The system includes a fluid property sensor/transmitter attached to a faucet which communicates via a wireless link to a controller. The wireless link is utilized to facilitate installation on a faucet. Various embodiments of the system include a system having a user detector for touchless control of the flow of water from a faucet, a digital display with audio and/or visual alarms to indicate if pre-set fluid conditions have been realized, a control valve to moderate flow of water to the faucet and a design to provide the incorporation of multiple sensors into the system.

BACKGROUND OF THE INVENTION

With increasing concerns with respect to environmental hazards, consumers are seeking products which reduce the risk to their health and to the health of their families. As a particular example, people are increasingly concerned about the quality of water which flows from their taps with respect to the clarity, pH, bacterial content, mineral content, and other parameters in addition to safety concerns with respect to the risk of scalding by hot water.

In response to these concerns, numerous water treatment systems and anti-scald systems have become available on the market which are connected to water supply systems to either prevent scalding or clean the water prior to consumption. Water treatment systems may include filter systems, water softeners or other known devices. Generally, however, these systems do not indicate whether the water being delivered from the faucet after passing through a treatment system is actually of a satisfactory quality as the water is not actually tested for its quality prior to leaving the faucet. Furthermore, in the event that water quality is not sufficient there have not been systems which would interrupt the flow of water in order to prevent exposure of the user to unsatisfactory water.

With respect to scalding, the risk of scalding through the use of hot water faucets by certain groups of people, particularly disabled, elderly or young children, in many homes or institutions is particularly prevalent. Often, these people mistake the hot and cold water taps on a faucet or have difficulty operating a faucet which leads to exposure to dangerously hot water from the faucet. Typically, water temperatures in excess of 42° C. can cause injury to unprotected skin. While in various hot water heaters it is possible to set the thermostat to a lower temperature, many hot water tanks have their thermostats set in excess of 60° C. in order to ensure adequate hot water supply to the system for tasks such as laundry or running a dishwasher where a higher water temperature is desired. Higher temperature water also reduces the potential for bacterial contamination of the water.

Accordingly, there has been a need for products which effectively monitor the physical properties of water flowing from a faucet and, if necessary, control the flow of water from the faucet as well as monitoring and controlling the flow of water from a faucet. For example, there has been a need to ensure that potentially scalding temperatures are not exceeded by individual faucets in a hot water system.

Past temperature monitoring and shut-off systems exist for controlling the flow of water or a fluid through conduits. Systems also exist with respect to faucets which regulate and control the flow of water to a faucet. These systems often include mechanisms for electronically monitoring the water temperature and adjusting the flow of hot and cold water to control a selected temperature. One disadvantage of these systems is that they are often highly complex requiring complete replacement of an entire faucet to enable their installation. This complexity often leads to an increased cost to the consumer from both the capital cost of the product as well as the labor required to install the product.

Furthermore, these past systems may detract from the aesthetic look of a particular faucet by requiring unsightly attachments to the faucet or, alternatively, requiring the complete replacement of a faucet with a design which does not complement the overall style or look to a bathroom or kitchen. For example, in those systems which do not require replacement of the existing faucet, the installation often detracts from the aesthetic appearance of the faucet either through visible wires, piping, valves and/or complex control panels.

Accordingly, there has been a need for a fluid monitoring system which may be installed on to existing faucets without detracting from the aesthetic look of the faucet, specifically without the use of unsightly wires or valve mechanisms. Furthermore, there has been a need for a fluid monitoring system which can be readily installed by either a plumber or a lay person with minimal plumbing experience.

Specifically, there has been a need for a system which monitors any number of physical properties of water flowing from a faucet and communicates the fluid property information to a controller for processing through a wireless communication link. Information received from the controller may be used for providing a digital display of physical properties, providing audio or visual alarms and/or for controlling a valve system in the event that certain physical parameters of the water do not meet a pre-set quality standard.

Still further, with respect to the wireless transmission of fluid property data, there has been a need to improve the efficiency of power consumption relating to the transmission of data and, specifically, a need for a system which transmits temperature data only if a user is present.

While systems exist which allow for touchless control of a faucet, few systems allow a user to control the temperature of the water. As a further disadvantage, some of these systems pressurize a faucet at the aerator causing stress in the spout and faucet outside of its engineered specifications which may lead to premature failure of the faucet.

Accordingly, there has been a need for a fluid monitoring device having increased power consumption efficiency through the provision of a user detector enabling non-continuous data transmission. Additionally, there has been a need for a fluid monitoring device that has the feature of touchless, retro-fittable flow control which also eliminates pressurizing the spout and faucet.

In addition to the above, there are certain installations wherein it becomes desirable that the integrity of the wireless data linkage is monitored between the faucet unit and the valve/processor/display system. Accordingly, there has also been a need wherein a transceiver is provided at both the spout unit and the valve/processor/display system in order to provide two-way communication between the faucet unit and valve/processor/display system.

It is also desirable that a fluid monitoring system is provided with modules which allow for the system to be expanded readily wherein different fluid property sensors may be readily incorporated into the system thereby allowing readily the custom design of a specific system for different applications. Such a system reduces the capital cost involved with the development of custom systems.

A review of the prior art indicates that systems exist which provide water temperature monitoring, control and shut-off in the event of excess temperatures. These include devices disclosed in U.S. Pat. No. 4,256,258, U.S. Pat. No. 5,184, 642, U.S. Pat. No. 4,756,030, U.S. Pat. No. 4,886,207 and U.S. Pat. No. 5,226,629. However, none of these patents disclose a device which addresses and solves the above problems, nor do they specifically disclose a wireless device which can be readily retrofitted to existing faucets.

SUMMARY OF THE INVENTION

In a first embodiment of the invention, there is provided a faucet control system comprising:

a spout unit (SU) for obtaining data from a faucet, processing that data and wirelessly transmitting a signal relating to that data; and, a flow control unit (FCU) for receiving the signal from the spout unit and controlling the flow of fluid from the faucet on the basis of the signal.

In various embodiments of the invention, the spout unit may specifically include a data collection module for receiving at least one data signal from at least one sensor configured to the data collection module and an SU processor module for processing the at least one data signal from the at least one sensor.

Preferably, the SU processor module includes at least one program means for identifying and processing data signals from respective sensors and data signals from each sensor are identified by an ID code.

Still further, in other embodiments, it is preferred that the SU processor module includes means for verify receipt of a data packet at a secondary processor, means for receiving and interpreting an error signal and means for providing any one of or a combination of an ON signal, an OFF signal, a flow increase signal or a flow decrease signal for transmission.

The spout unit may also include an SU transceiver module operatively connected to the SU processor module for transmitting and receiving data.

With respect to the flow control unit, the FCU may include an FCU transceiver module for receiving data from a spout unit and transmitting data from the flow control unit and a FCU processor module for processing data relating to the fluid received from a spout unit wherein the FCU processor module includes at least one program for interpretation of data signals from respective sensors of the spout unit as for the spout unit above.

In a further embodiment, the flow control module includes at least two valves for connection to independent faucets and the FCU processor module includes means for independently controlling the at least two valves.

In a still further embodiment, the faucet control system may also include a display unit (DU) for display of data relating to the fluid. wherein the display unit includes a DU transceiver module for receiving data from a spout unit and transmitting data from the display unit, a DU processor module for processing data relating to the fluid and a display module for displaying data relating to the fluid.

In further embodiments, the SU processor module and FCU processor module each include means for parallel processing of data collected from the spout unit, the at least one sensor is selected from any one of or a combination of a temperature sensor, user sensor, pH sensor, fluid clarity sensor, mineral sensor and microorganism sensor and the spout unit and includes standard faucet threads for attachment of the spout unit to the faucet.

In accordance with a more specific embodiment, a faucet control system to monitor the temperature of a fluid flowing from a faucet and to control the flow of a fluid through the faucet is provided, comprising:

a temperature sensor and transmitter for attachment to the faucet, the temperature sensor and transmitter for obtaining temperature data relating to the temperature of a fluid flowing from the faucet and for wireless transmission of the temperature data;

a user detector operatively connected to the temperature sensor and transmitter, said user detector including means for activating the temperature sensor and transmitter in the presence of a user; and a controller for receiving and processing the temperature data wherein the controller includes means for initiating fluid flow from the faucet and/or means for interrupting fluid flow from the faucet if the temperature of the fluid flowing from the faucet exceeds a pre-set value or the user detector no longer detects the presence of a user.

In yet another embodiment, a faucet control system to monitor the temperature of a fluid flowing from a faucet is provided, said system comprising:

a temperature sensor and transmitter adapted for attachment to the faucet, the temperature sensor and transmitter for obtaining temperature data relating to the temperature of a fluid flowing from the faucet and for noncontinuous wireless transmission of the temperature data;

a user detector operatively connected to the temperature sensor and transmitter, said user detector including means for activating the temperature sensor and transmitter in the presence of a user, and a controller operatively connected to a valve unit, the controller for receiving and processing the temperature data, the controller including means for interrupting fluid flow through the valve unit, if the temperature of the fluid flowing from the faucet exceeds a pre-set value or the user detector no longer detects the presence of a user.

In yet a further embodiment, a faucet control system to control the flow of a fluid through a faucet is provided comprising:

a user detector for detecting the presence of a user at the faucet and generating an ON signal in the presence of a user and an OFF signal in the absence of a user;

a transmitter operatively connected to the user detector for attachment to the faucet, the transmitter for wireless transmission of the ON signal and OFF signal;

a controller for receiving and processing the ON signal and OFF signal wherein the controller includes means for initiating fluid flow from the faucet upon receipt of the ON signal and means for interrupting fluid flow from the faucet upon receipt of the OFF signal.

In a still further embodiment, a faucet control system is provided, comprising: a spout unit (SU) and a flow control unit (FCU)

the spout unit for attachment to the outflow end of a faucet, the spout unit including:
  a SU data collection module for obtaining fluid data relating to the physical properties of a fluid flowing through the faucet;
  a SU processor module operatively connected to the SU data collection module for receiving and processing the fluid data;
  a SU transceiver module operatively connected to the SU processor module for transmitting the fluid data and for receiving data from the FCU; and,
  a SU power module operatively connected to the SU data collection module, SU processor module and SU transceiver module for providing power to the SU;
the flow control unit for attachment to the inflow piping of the faucet, the flow control unit including a FCU transceiver module, FCU processor module and flow control module:
  the FCU transceiver module for receiving data from the spout unit and for transmitting data to the spout unit;
  the FCU processor module operatively connected to the FCU transceiver module for receiving and processing data from the FCU transceiver module, for providing data to the FCU transceiver module, and for providing data to the flow control module;
  the flow control module including a valve operatively connected to the inflow piping of the faucet, the flow control module also operatively connected to the FCU processor module for receiving instructions to control the valve.

BRIEF DESCRIPTION OF THE DRAWINGS

These and other features of the invention will be more apparent from the following description in which reference is made to the appended drawings of the valve unit in accordance with the invention, wherein.

DETAILED DESCRIPTION OF THE INVENTION

Figure 1:
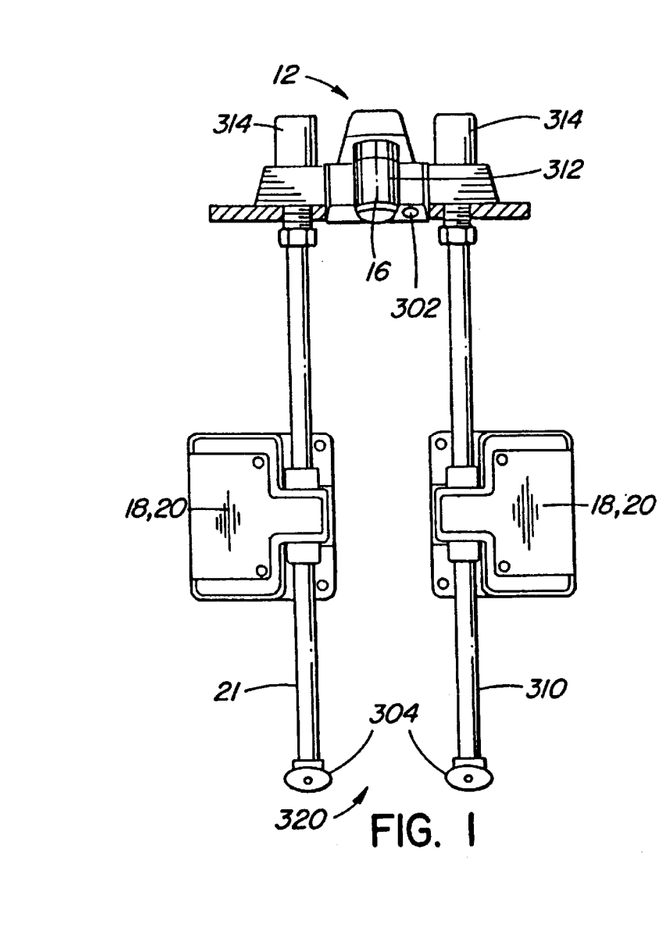
FIG. 1 is a front sectional view of one embodiment of the invention showing a user sensor with a combined controller and shut-off valve.
Figure 2:
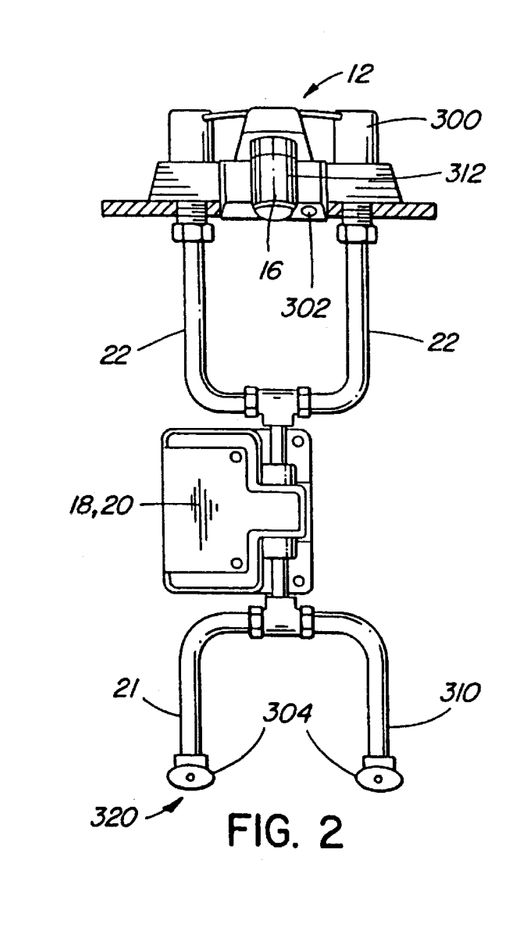
FIG. 2 is a front sectional view of one embodiment of the invention showing an existing faucet retro-fitted to function as a touchless, constant water temperature faucet.
Figure 3:
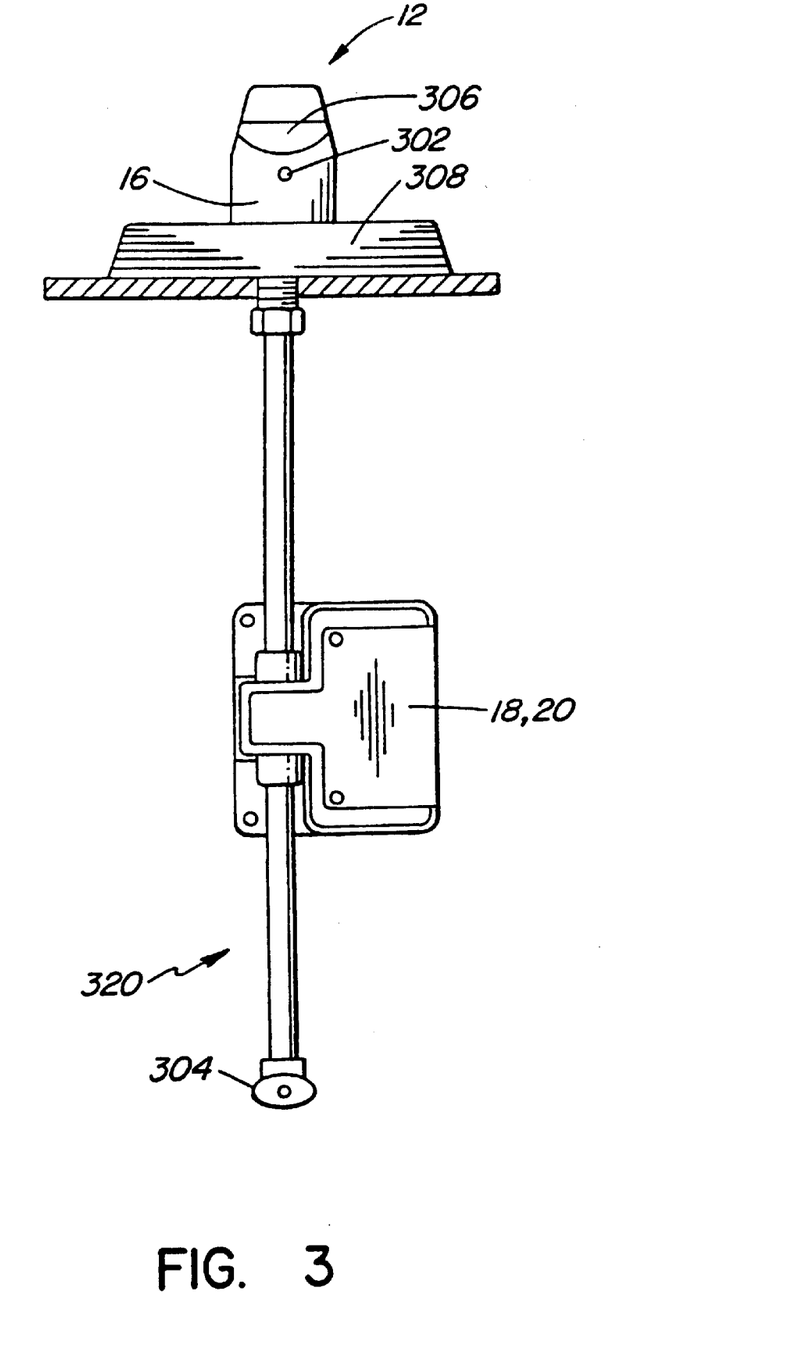
FIG. 3 is a front sectional view of one embodiment of the invention showing a faucet containing an integrated user sensor.
Figure 4A:
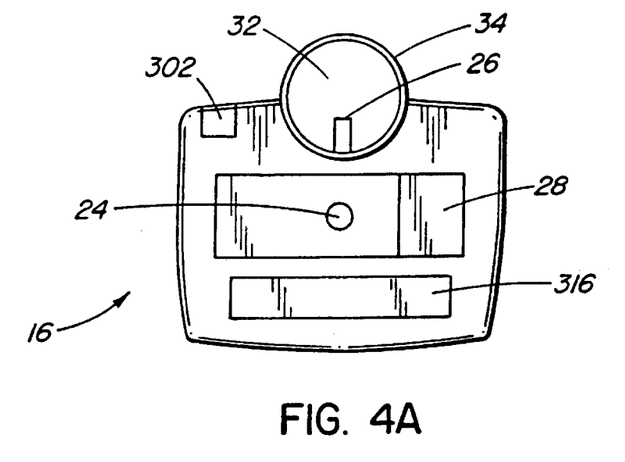
FIG. 4a is a top sectional view of a temperature sensor/transmitter according to one embodiment of the invention.
Figure 4B:
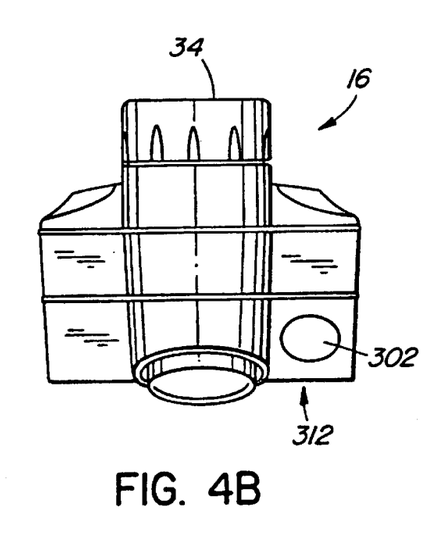
FIG. 4b is a side view of a typical aerator/spout module.
Figure 4C:
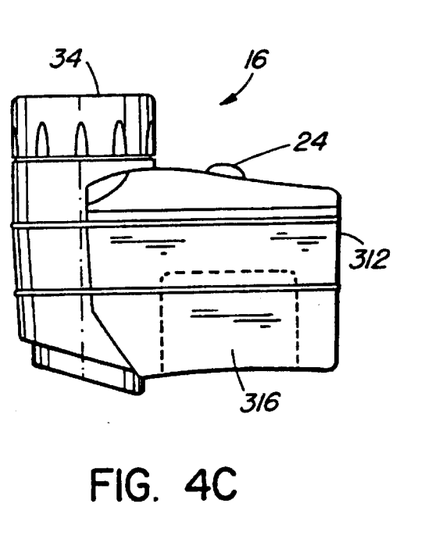
FIG. 4c is a top view of a typical aerator/spout module.
Figure 5:
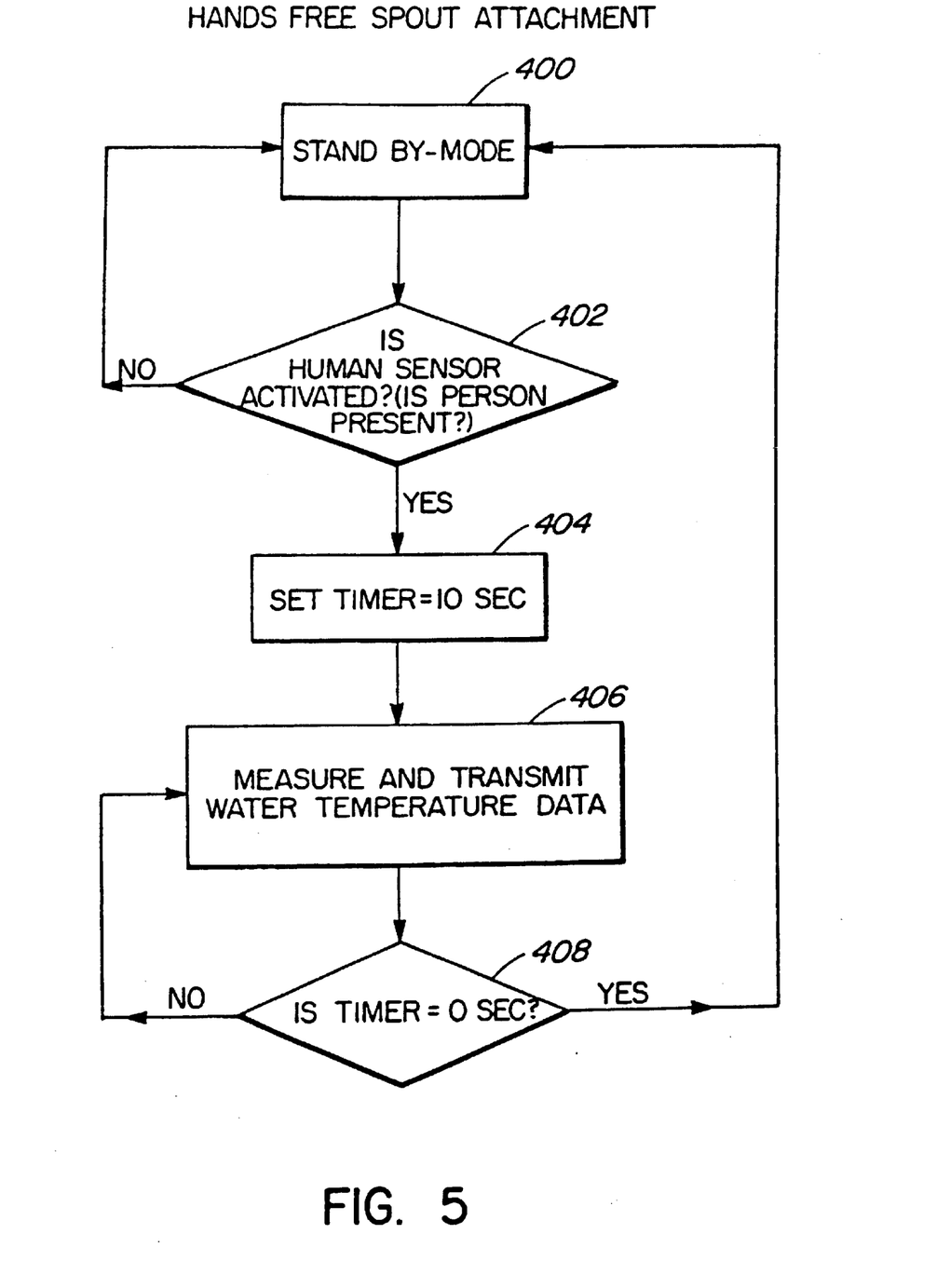
FIG. 5 is a flow chart showing a preferred control scheme for the operation of a hands-free spout attachment in accordance with one embodiment of the invention.
Figure 6:
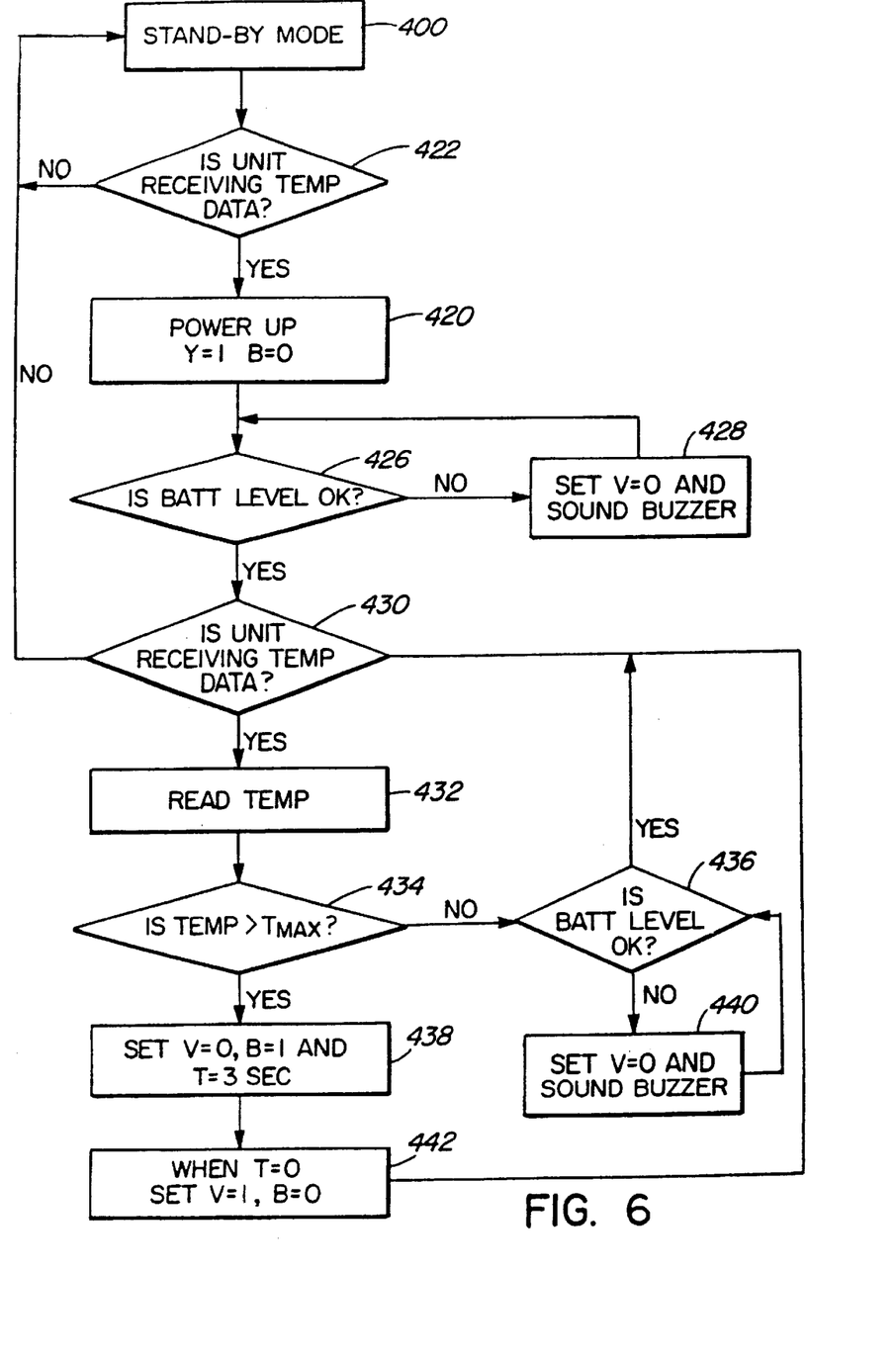
FIG. 6 is a flow chart showing a preferred control scheme for the operation of a valve unit when in the presence of a user detector in accordance with one embodiment of the invention.
Figure 7:
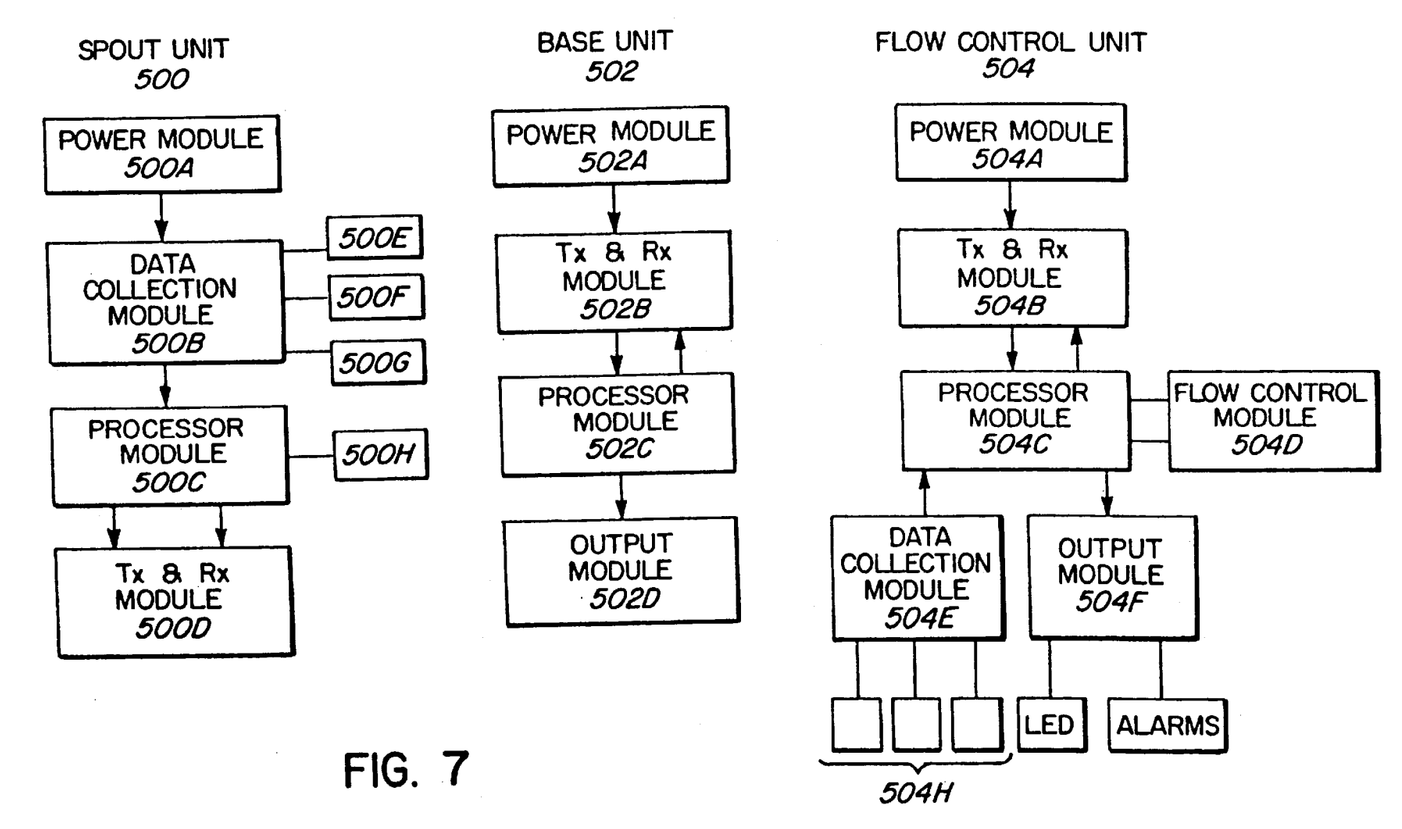
FIG. 7 is a block diagram showing modules of a further embodiment of the invention.

With reference to FIGS. 1–7, various embodiments of the invention are illustrated. FIG. 1–3 illustrate the general components of the invention and show the configuration of the invention in various plumbing installations. FIGS. 4A, 4B and 4C show the general components of an aerator/spout unit. FIGS. 5 and 6 show flow diagrams for the control of the aerator/spout unit and valve unit in accordance one embodiment of the invention. FIG. 7 shows a block diagram of a further embodiment of the invention.

Three embodiments of a touchless, wireless, temperature monitoring device 320 are shown in FIGS. 1, 2 and 3.

With reference to FIGS. 1, 2, and 3, an anti-scald device 320 is shown in combination with a user detector 302. In each of these figures, the temperature monitoring device 320 includes a temperature sensor/transmitter 16, an integrated controller 18/shut-off valve 20, and a user detector 302.

Detection of a user by the user detector 302 activates the temperature sensor/transmitter 16 to generate temperature data. The temperature data is transmitted to the controller 18 where the temperature data is received and processed. The controller 18 activates the shut-off valve 20 initiate the flow of water and/or stop water flow should the temperature exceed a pre-set maximum temperature or the user moves away from the faucet. The temperature sensor/transmitter 16, the controller 18 and the valve 20 are preferably battery operated.

FIG. 1 illustrates an embodiment in which an existing faucet 12 is retrofitted with a wireless temperature monitoring system resulting in a touchless faucet which provides the user with direct temperature control of water flowing from the faucet. In this embodiment, the user detector 302 is integrated with the temperature sensor/transmitter 16 to form an aerator module 312. An integrated controller 18/shut-off valve 20 is configured to each of the hot water 21 and cold water 310 pipes. In this embodiment, both the hot and cold water controller 18/shut-off valve units 18,20 will simultaneously receive temperature data from the aerator module 312. The simultaneous receipt of temperature data allows the valves 20 on both the hot water 21 and cold water 310 pipes to open concurrently to initiate water flow and/or close concurrently thereby stopping all water flow to the faucet 12 in the e(vent that the pre-set maximum temperature is exceeded or the user moves away from the faucet.

In operation, a user approaches the faucet 12 and operates the knobs 314 in the normal manner for starting and stopping water flow from the faucet. The user detector 302, detecting the presence of a user, causes temperature data to be transmitted from the temperature sensor/transmitter 16 whereby it is simultaneously received by the controllers 18 on the hot and cold water supply lines 21,310. The receipt of temperature data causes the shut-off valves 20 to simultaneously open allowing water to flow from the faucet. In the event that the water temperature flowing from the faucet exceeds a pre-set maximum, the controllers 18 cause valves 20 to close. Alternatively, if the user moves away from the faucet, temperature data will cease being transmitted and the valves 20 will simultaneously close.

The location of the integrated controller 18/shut-off valve 20 beneath the faucet 12 ensures high pressure water is upstream of the faucet 12.

FIG. 2 shows an embodiment in which an existing faucet 12 is retrofitted on an existing faucet to function as a touchless, constant water temperature faucet. In this embodiment, the existing faucet control knobs are opened to allow water to flow through the faucet 20. Decorative caps 300 may be provided to cover the existing faucet knobs in order to prevent a user from attempting to operate the existing faucet knobs. Hot water 21 and cold water 310 pipes are joined upstream of the integrated controller 18/shut-off valve 20 in order to provide hot and cold water mixing at the shut-off valve 20. Downstream of shut-off valve 20, pipes 22 are separated for connection to the existing faucet 12. The temperature of the water to the faucet 12 is fixed by the position of the compression stops 304 on each of the hot water 21 and cold water 310 pipes. The controller is linked via a wireless link to an aerator module 312 as described above.

In this embodiment, a user merely approaches the faucet and places their hands beneath the aerator module 312. The user detector 302, upon sensing the user initiates the transmission of temperature data from the aerator module 312. The integrated controller 18/shut-off valve 20, upon receiving temperature data, opens the shut-off valve to allow mixed hot and cold water to flow through the faucet. In the event that the temperature of the water flowing from the faucet exceeds a pre-set value, the shut-off valve will close thus stopping water flow from the faucet 12. Similarly, if a user removes their hands from the faucet, the transmission of temperature data ceases and the controller 18 causes the shut-off valve 20 to close, thus stopping the flow of water from the faucet.

FIG. 3 shows an embodiment of the invention incorporating touchless and antiscald properties into a faucet having a tepid water supply. In this embodiment, the temperature sensor/transmitter 16 is preferably packaged in the base of the faucet 12 and communicates through a wireless link with the integrated controller 18/shut-off valve 20. This embodiment would be typically used in an institutional installation where a warm water supply would be available. Accordingly, in this embodiment, a warm or tepid water supply requires only a single pipe and hence, only a single controller 8/shut-off valve 20 to provide full anti-scald protection in the event of a change in water supply temperature. Furthermore, this embodiment also illustrates factory installation of electronics into the faucet which can communicate with one or more controller(s) 18/shut-off valve(s) 20 via a wireless link.

FIGS. 4a, 4b, 4c show an aerator module 312 containing a temperature sensor/transmitter 16, a temperature sensor 26, a controller/transmitter 28, a user detector 302, a battery 316 and an optional bypass button 24. The user detector 302 can be any touchless detection switch known in the art that is suitable for a faucet application. For example, the user detector 302 could be an infrared switch. The user detector 302 acts to detect the presence of a user, generally a user's hands approaching the faucet 12. The aerator module 312 is provided with a bore 32 to permit the passage of water there through and standard faucet threads 34 to permit attachment of the aerator module 312 to the outflow end of faucet. The temperature sensor 26 extends into the bore 32 to obtain temperature data from the fluid flowing through the bore 32. The bypass button 24 may be implemented to enable a user to access hotter water than would otherwise be allowed to flow from the faucet Essentially, in the event that a user wishes to access hotter water, pressing the by-pass button will prevent the controller 18/shut-off valve from closing in the event that the maximum temperature is exceeded during a particular user session. The controller/transmitter 28 receives and processes signals from the user detector 302 and temperature sensor 26 and transmits temperature data and/or an ON or OFF signal to the controller 18/shut-off valve 20.

A typical flow chart of the operation of the hands-free, touchless, spout attachment (aerator module) 312 is shown in FIG. 5. When the faucet 12 is not in use, the temperature sensor/transmitter 16 circuit is in a stand-by mode (box 400) wherein no temperature data is generated or transmitted. During the standby mode (box 400) the power to the temperature sensor/transmitter circuit 16 is off.

Detection of a user by the user detector 302 (box 402) will start a 10 second timer (box 404). Power to the temperature sensor/transmitter 16 will be turned on in response to the detection of a user. Measurement of water temperature (box 406) is then performed and this data is transmitted to the controller 18.

At the expiry of the timer (box 408) the state of the temperature sensor/transmitter 16 circuit is sent back to standby mode 400 where the continued presence of a user will cause the timer to be reset and temperature data transmission to continue. If a user is no longer present the transmission of temperature data stops and the power to the temperature sensor/transmitter 16 is turned off, further enhancing battery life and ensuring that water flow is stopped in the absence of a user.

A flow chart of the operation of the valve unit 18, 20 in the presence of a touchless aerator module 312 is shown in FIG. 6. The valve unit 18,20 has three binary variables, namely, safety mode, "S", valve, "V", and buzzer, "B". The power to the valve unit 18,20 will be turned on (box 420) from standby mode 444 when it starts to receive temperature data (box 422). This causes variable B to be set to 0 and V to be set to 1 (valve open). The battery level is checked (box 426) and if it is not OK, V is set to 0 (valve closed) and a low battery level indicator (i.e. a buzzer) is activated (box 428). If the battery level is OK, the unit checks to ensure temperature data is still being received (box 430). Continued receipt of temperature data causes the data to be read (box 432) and compared to a pre-set maximum allowable temperature (box 434). In the event that the water temperature is over the maximum, V is set to 0, B is set to 1 and a 3 second timer is started (box 438). When the timer reaches 0, V is set to 1 and B is set to 0 (box 442) and the unit checks to ensure temperature data is still being received 430 before reading the temperature again.

If the temperature is under the allowable maximum, the battery level is checked. In the case that the battery level is not OK, V is set to 0 and a low battery indicator is activated (box 440). If the battery level is OK the unit checks to ensure it is still receiving temperature data 430 before reading the temperature again.

In some circumstances it may be desirable to provide a base unit beside the faucet to display the water temperature, using for example an LCD, and/or sound an alarm. Preferably, the base unit and the controller 18/shut-off valve 20 will receive data independently.

Preferably, the valve unit is also provided with a rotary switch which allows the user to set the value of the shut-off temperature at discreet levels. It is also preferable that the valve is a solenoid valve.

Similarly, in order to facilitate installation in an environment where multiple units may be installed in close proximity to one another, in one embodiment the temperature sensor/transmitter 16 and valve unit 20 are preferably provided with a frequency selector in order to enable operation of adjacent units at distinct frequencies so as to minimize the risk of interference. Alternately, each paired temperature sensor transmitter 16 and valve unit 20 may be provided with discrete ID codes to ensure that data is directed and utilized at the appropriate location.

In certain installations, such as in residential care facilities, old age homes, day care facilities and schools, full time anti-scald protection may be desired. Accordingly, units may be built which do not allow for de-activation of the anti-scald device.

While the above described embodiments contemplate a radio frequency link between the sensor/transmitter 16, controller 18 and valve unit 20, other wireless links such as an LED, infrared or sound links may be utilized.

The system also contemplates an embodiment in which an ON signal is generated by the user detector in the presence of a user and an OFF signal is generated by the user detector in the absence of a user and these signals are transmitted to a controller/valve system to initiate or interrupt the flow of fluid from the faucet, respectively. Accordingly, this embodiment does not provide anti-scald protection but merely automates the flow of water from a faucet wherein a wireless link is used between a user detector/transmitter and controller/valve system.

A further design of the system is shown in FIG. 7 including a spout unit 500, a base unit 502 and a flow control unit 504.

The spout unit 500 is shown including a power module 500*a*, a data collection module 500*b*, a processor module 500*c* and transceiver module 500*d*. The power module 500*a* provides power to the spout unit and may obtain power from a battery or turbine in contact with the fluid flowing through the faucet. The data collection module 500*b* is adapted to collect data from a variety of different sensors either individually or in combination. Examples of various sensors may include sensors for measuring temperature, pH, conductivity, clarity, specific mineral or chemical content such as pesticide, chlorine, lead, calcium or iron, microorganism content such as bacterial, cysts, protozoa or fecal or other sensors including sensors for measuring sediment content such as silt, rust or asbestos.

The data collection module's primary function is to provide data to the processor module for processing. Preferably, the data collection module is designed in order that sensors 500*e, f*, or *g* may be configured to the data collection module and provide data in a format specific to that sensor to the data collection module for sending to the processor 500*c*.

As such, a data collection module may be provided with a number of data channels to which individual sensors may be attached. In order to enhance the flexibility of the system, for customization to a particular application, the data collection module may be provided with a relatively large number of data channels which may not all be required for a specific application. In the event that a specific sensor or combination of sensors is required for a particular application, these sensors would be attached to the data collection module.

The sensors would provide a signal to the processor in a format which would enable the processor 500*c* to recognize the type of sensor which has been configured to the system. This can be accomplished in a variety of ways. For example, if a temperature sensor is configured to the data collection module, the circuitry within the temperature sensor could provide an ID code indicating that a temperature signal is being sent over that particular channel. The processor, upon receiving that ID code would recognize that signal as a temperature signal and, accordingly, process that signal according to a specific temperature processing program.

Similarly, other types of sensors could be provided with different ID codes for specific interpretation by the processor 500*c*.

Accordingly, the processor may be provided with a number of pre-set programs for the interpretation of different data types. For example, temperature data can be interpreted in terms of an absolute value to provide an output for determining whether the fluid flowing from the faucet should be increased, decreased or terminated. Similarly, the processor may have a pre-set program for interpreting pH, water clarity etc. or a program for interpreting data from a combination of sensors.

This procedure provides the advantage of allowing sensor technology to change without necessarily requiring redevelopment of a new processor module. That is, if a new sensor can be designed to provide a data output which can be interpreted by the processor, up-grades in the system can be implemented without re-design of the complete spout unit.

A transceiver module 500*d* is configured to the processor module 500*c* to enable the transmission and reception of data. Primarily, data relating to either the fluid properties or data pertaining to desired flow control actions is transmitted from the transceiver to the flow control unit 504 and/or base unit 502.

In addition, data from the base unit 502 and/or flow control unit 504 is received, the nature of which may include signal integrity data and/or raw data transmission for parallel processing by other processors in the system. In the case of signal integrity data, the processor module 500*c* may provide a signal integrity signal to an output device 500*h*, such as an LED which would illuminate while data is being properly transmitted and received between the spout unit 500 and the base unit 502 and/or the flow control unit 504. Data may be improperly received by a base unit 502 or flow control unit 504 as a result of malfunction of either the spout unit 500 or flow control unit 504, interference of a transmitted signal or an out-of-range problem between respective units. Specific programs for generating, receiving and interpreting an error signal may also be provided which may also include means for re-transmitting data Parallel processing capabilities between respective processors in the system may be desirable in circumstances where the quantity of data collected from the data collection module exceeds the processing capabilities of the processor module 500*c* and, accordingly, will be transmitted directly to a secondary processor for processing.

In a further embodiment, processor 500*c* also gives an individual spout unit an ID# for identification of the source of data for more sophisticated control of embodiments where multiple spout units 500 may communicate within an localized environment. See for example, FIG. 9, described in greater detail below.

The base unit 502 is shown to include a power module 502*a*, a transceiver module 502*b*, a processor module 502*c* and an output module 502*d*. Primarily, the base unit operates to provide a visual display of fluid data received from the spout unit 500. In addition, the processor module 502*c* may provide parallel processing capabilities for data collected by the spout unit 500 wherein data would be received by transceiver 502*b*, processed by processor 502*c* and re-transmitted from the transceiver 502*b*.

The output module 502*d* may provide a visual display of data or an audio or visual alarm.

The flow control unit 504 is shown to include a power module 504a, a transceiver module 504b, a processor module 504c, a flow control module 504d and optional input module 504e and output module 504f.

Primarily, the flow control unit operates to control the flow of fluid through the piping to which the flow control unit is configured. In addition, the processor module 504c may provide parallel processing capabilities for data collected by the spout unit 500 wherein data would be received by transceiver 504b, processed by processor 504c and either provide flow control instructions to flow control module 504d or re-transmit data from the flow control unit 504, possibly to the base unit 502 or the spout unit 500. Alternately, data would be received by transceiver 502b, processed by processor 502c and transmitted from the base unit 502 to provide flow instructions to the flow control unit 504.

In addition, in certain installations, the flow control unit may also be provide with a data collection module 504e with sensors 504h as described above with respect to the data collection module 500b. The use of a data collection module 504e at the flow control unit may be desirable in certain installations where a comparison of data from the inflow piping to the data collected at the outflow of the spout is desirable.

An output module 504f may also be implemented to provide output as described above for output module 502d.

The flow control module 504d may increase flow of fluid, decrease the flow of fluid or shut-off the flow of fluid through the piping depending on the actual flow control device or the type of control signal received from processor 504c. For example, flow control module 504d may be an on/off shut-off valve system wherein fluid flow is either on or off. Alternatively, the flow control module 504d may be an electronically controlled variable position valve which can increase or decrease the flow of fluid through piping.

Figure 8:
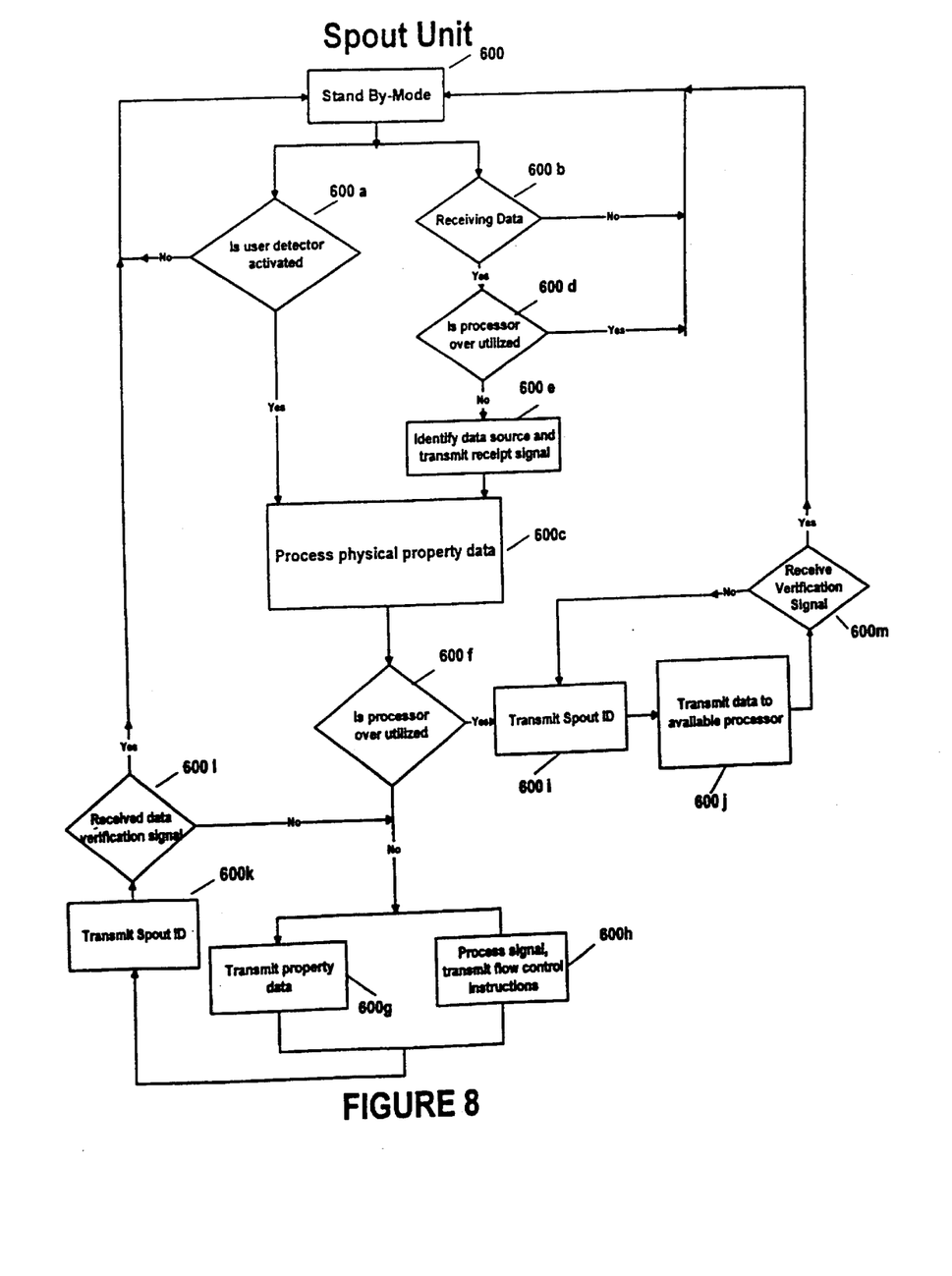
FIG. 8 is a flow chart showing the operation of a spout unit processor having parallel processing capabilities.
Figure 8A:
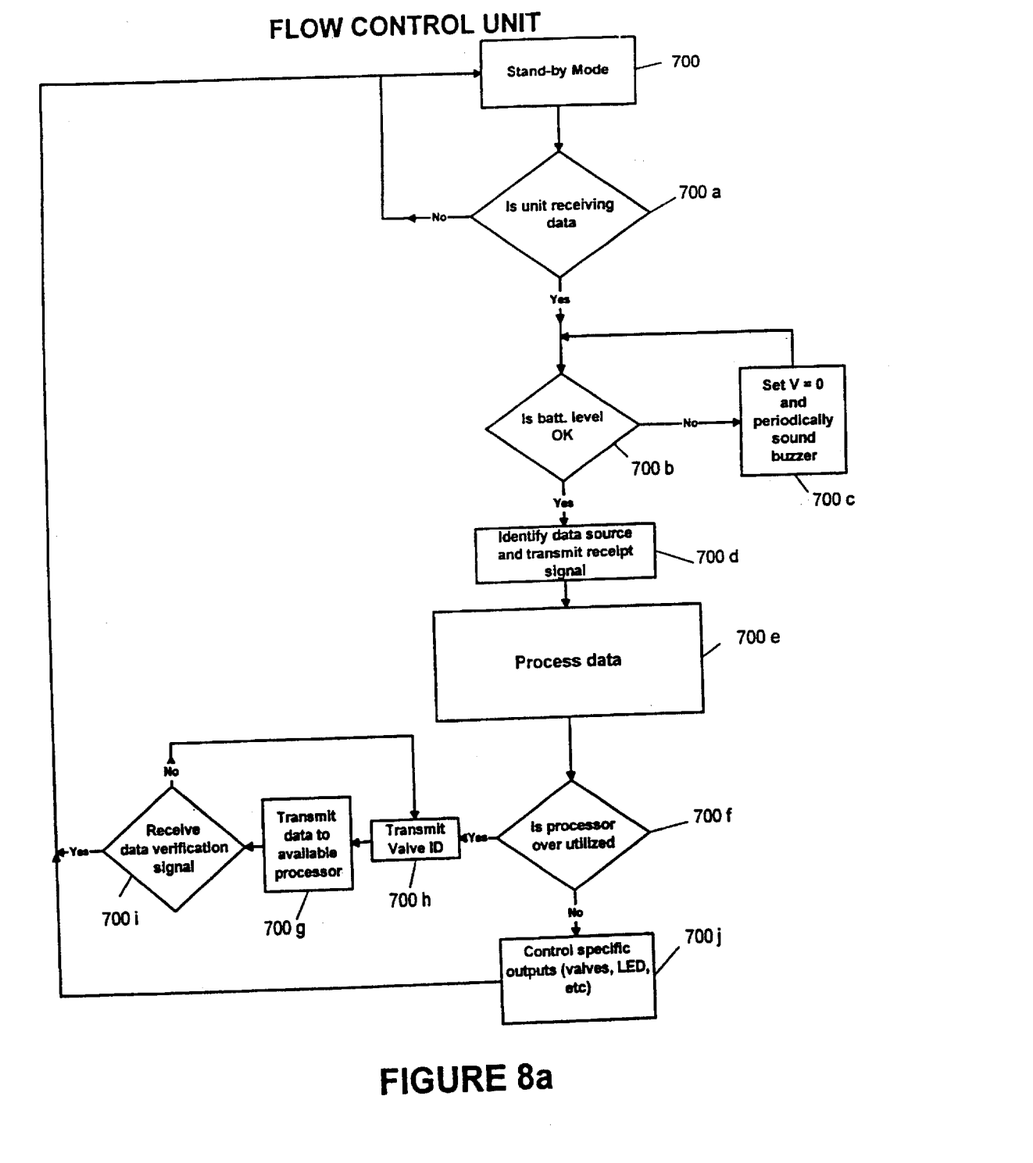
FIG. 8a is a flow chart showing the operation of a valve unit processor having parallel processing capabilities; and, FIG. 9 shows a farther embodiment of the invention where multiple spout units communicate with a valve unit having a distributor.

With reference to FIGS. 8 and 8a, flow diagrams for a processing scheme for a a spout unit and flow control unit are shown wherein a processing scheme having functionality for (1) non-parallel processing, (2) parallel processing, (3) on-board processing and generation of flow control signals, and (4) collection and ransmission of raw data.

When inactive, the spout unit is in a stand-by mode (box 600) wherein the system periodically checks to see if the user (human) sensor (box 600a) is activated or receiving data (box 600b). If the human sensor is activated, physical property data received from the spout is processed (box 600c). Alternatively, if a user is not present or the unit is not receiving data, the unit returns to the stand-by mode (box 600). If the unit is receiving data (box 600b) (ie from another processor in the system), a check is made to determine if the processing capabilities of the spout unit are being over utilized (box 600d). If yes, the spout unit cannot process the data demands and returns to the stand-by mode (box 600). If the spout unit processor is not being over utilized (box 600d), the data source is determined, a receipt signal is sent (box 600e) and the data is processed (box 600c). During processing (box 600c), a check is made to determine if the processor is being over utilized (box 600f). If no, either fluid property data (box 600g) or flow control instructions (box 600h) is transmitted as a data packet with an appropriate ID# (box 600k). If a data verification signal is received (box 600l), the spout unit returns to the stand-by mode (box 600). If a data verification signal is not received property data (box 600g) or flow control instructions (box 600h) are transmitted again along with spout ID (box 600k).

If during processing of the physical property data (box 600c), the processor is over utilized (box 600f), a data packet identified by ID# (box 600i) is transmitted to an available processor (box 600j). If a data verification signal (box 600m) is received, the spout unit returns to the stand-by mode (box 600). If a data verification signal is not received, the data packet (box 600i) is re-transmitted to an available processor (box 600j).

Similarly, the flow control unit has a stand-by mode (box 700) which periodically checks if data is being received (box 700a). If no, the unit returns to the stand-by mode (box 700). If yes, the unit checks whether the power supply is adequate (normally a battery) (box 700b). If no, a signal is sent to close the valve(s) and to activate an alarm (box 700c). If the power supply is adequate, the data source OD#) is identified, a receipt signal is sent (box 700d), and data is processed (box 700e). If the processor is over utilized (box 700f), a data packet (box 700g) identified by a flow control unit ID# (box 700h) is transmitted to an available processor. If a data verification signal is received (box 700i), the flow control unit returns to stand-by mode (box 700). If a data verification signal is not received (box 700i), the data packet is re-transmitted (box 700h and box 700g).

If the processor is not over-utilized, the appropriate flow control signal (box 700j) is sent to the flow control system and the unit returns to stand-by mode (box 700).

Figure 9:
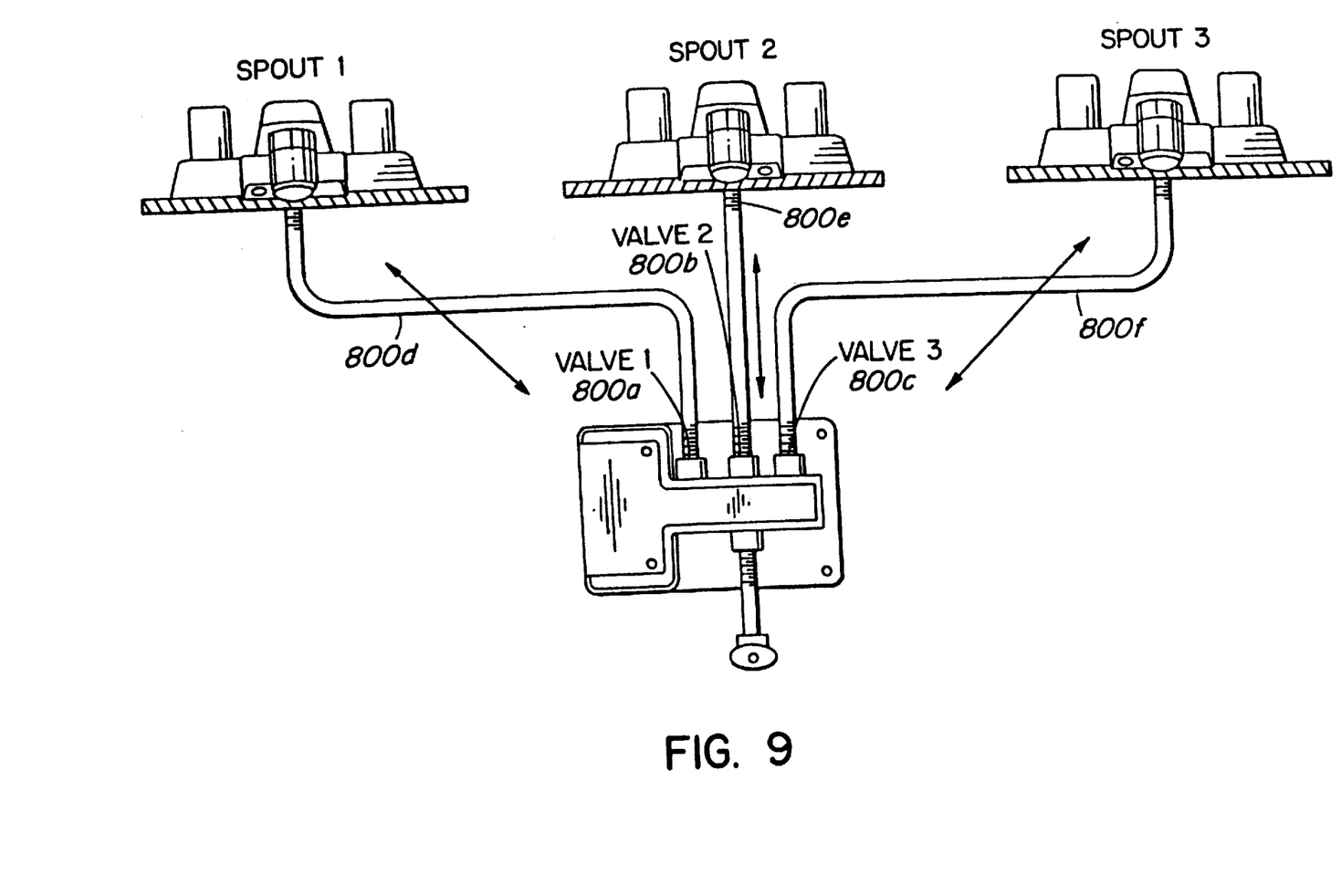

FIG. 9 shows a further embodiment of the invention wherein a flow control unit 800 utilizes a manifold for the distribution of a water supply from a single source to multiple downstream faucets. In this embodiment, the flow control unit 800 has three independently controllable valves 800a, 800b and 800c which may independently control the flow through their respective piping systems 800d, 800e and 800f. As indicated above, wireless communication between spout units 1, 2 and 3 and the flow control unit 800 utilizing either specific frequencies or data packet ID#'s enables independent control of each valve 800a, 800b or 800c.

In each instance, the physical separation of the spout unit, base unit and flow control unit primarily permits the system to be retro-fit to existing faucets or fluid control systems or provide a system in which factory installed electronics in a spout communicate with a base unit or flow control unit.

By providing a system wherein the fluid flow is controlled, various embodiments of the system can be realized to increase flow, decrease flow or shut-off flow as a result of one or more input parameters and an appropriate control algorithm.

For example, if a flow control unit is configured to a hot water supply system and temperature is approaching a pre-set shut-off temperature, an appropriate algorithm will ensure that flow to a hot water supply pipe is restricted so as to keep the temperature below a pre-set value (ie, an anti-scald system without shut-off).

Similarly, if water temperature drops below a certain value, an appropriate algorithm can increase flow of hot water to maintain water within a desired range.

In further embodiments, control algorithms may include inputs from more than one fluid property parameter to affect the flow control output.

In instances where fluid flow is restricted (as opposed to shut-off), appropriate valves may include any variable position valve with an appropriate position controller.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

What is claimed is:

1. A faucet control system comprising a spout unit (SU) for attachment to a faucet and for obtaining data from the faucet and a flow control unit (FCU) for attachment to the inflow piping of the faucet and for controlling the flow of fluid from-the faucet, the spout unit including an SU data collection module for receiving at least one data signal from at least one sensor configured to the SU data collection module, an SU processor module for processing data from the SU data collection module and FCU and an SU transceiver module for transmitting and receiving data between the SU and FCU, the FCU including an FCU transceiver module for transmitting and receiving data between the FCU and SU, an FCU processor module for processing data from the SU and a valve operatively connected to the processor module.

2. A faucet control system as in claim 1 wherein the SU processor module includes at least one program means for identifying and processing data signals from respective sensors.

3. A faucet control system as in claim 1 wherein data signals from each sensor are identified by an ID code.

4. A faucet control system as in claim 1 wherein the SU processor module includes means for verifying receipt of a data packet at a secondary processor.

5. A faucet control system as in claim 1 wherein the SU processor module includes means for receiving and interpreting an error signal.

6. A faucet control system as in claim 1 wherein the SU processor module includes means for providing any one of or a combination of an ON signal, an OFF signal, a flow increase signal or a flow decrease signal for transmission.

7. A faucet control system as in claim 1 wherein the spout unit, and flow control unit each include a power module selected from any one of or a combination of a battery or a turbine for providing power to the spout unit and flow control unit.

8. A faucet control system as in claim 1 wherein the FCU processor module includes at least one program for interpretation of data signals from respective sensors of the spout unit.

9. A faucet control system as in claim 8 wherein distinct data signals are identified by an ID code.

10. A faucet control system as in claim 1 wherein the FCU processor module includes means for providing any one of or a combination of an ON signal, an OFF signal, a flow increase signal or a flow decrease signal to a flow control module within the FCU.

11. A faucet control system as in claim 1 wherein the flow control unit includes a flow control module responsive to any one of or a combination of an ON signal, an OFF signal, a flow increase signal or a flow decrease signal from the FCU processor module.

12. A faucet control system as in claim 1 wherein the flow control module includes a variable position valve.

13. A faucet control system as in claim 1 wherein the flow control module includes at least two valves for connection to independent faucets, and the FCU processor module includes means for independently controlling the at least two valves.

14. A faucet control system as in claim 1 further comprising a display unit (DU) for audio or visual display of data received from the spout unit or the flow control unit.

15. A faucet control system as in claim 14 wherein the display unit includes a DU transceiver module for receiving data from the spout unit or the flow control unit and transmitting data from the display unit.

16. A faucet control system as in claim 14 wherein the display unit includes a DU processor module for processing data received from the spout unit or the flow control unit.

17. A faucet control system as in claim 14 wherein the display unit includes a display module for displaying data received from the spout unit or the flow control unit.

18. A faucet control system as in claim 1 wherein the SU processor module and FCU processor module each include means for parallel processing of data collected from the spout unit.

19. A faucet control system as in claim 1 wherein the at least one sensor is selected from any one of or a combination of a temperature sensor, user sensor, pH sensor, fluid clarity sensor, mineral sensor and microorganism sensor.

20. A faucet control system as in claim 1 wherein the spout unit includes standard faucet threads for attachment of the spout unit to the faucet.

21. A faucet control system as in claim 1 further comprising a user detector operatively connected to the SU or FCU for activating the SU or FCU in the presence of a user and de-activating the SU or FCU in the absence of a user.

22. A faucet control system comprising:

a spout unit (SU) and a flow control unit (FCU)

the spout unit for attachment to a faucet, the spout unit including:
  a SU data collection module for obtaining fluid data relating to the physical properties of a fluid flowing through the faucet;
  a SU processor module operatively connected to the SU data collection module for receiving and processing the fluid data;
  a SU transceiver module operatively connected to the SU processor module for transmitting the fluid data and for receiving data from the FCU; and,
  a SU power module operatively connected to the SU data collection module, SU processor module and SU transceiver module for providing power to the SU;

the flow control unit for attachment to the inflow piping of the faucet, the flow control unit including a FCU transceiver module, processor module and flow control module:

the FCU transceiver module for receiving data from the spout unit and for transmitting data to the spout unit;

the FCU processor module operatively connected to the FCU transceiver module for receiving and processing data from the FCU transceiver module, for providing data to the FCU transceiver module, and for providing data to the flow control module;

the flow control module including a valve-operatively connected to the inflow piping of the faucet, the flow control module also operatively connected to the FCU processor module for receiving instructions to control the valve.

23. A faucet control system comprising a spout unit (SU) for attached to a faucet and for obtaining data from the faucet and a base unit;

the spout unit including an SU data collection module for receiving at least one data signal from at least one sensor configured to the SU data collection module, an SU processor module for processing data from the SU data collection module and base unit and an SU transceiver module for transmitting and receiving data between the SU and base unit, the base unit including a base transceiver for transmitting and receiving data between the SU and base unit, a base unit processor module for processing data from the SU and a display module for audio or visual display of data.

24. A faucet control system comprising a flow control unit (FCU) and base unit:

the FCU for attachment to the inflow piping of the faucet, for obtaining data from the faucet and for controlling the How of fluid from the faucet, the FCU including an FCU data collection module for receiving at least one data signal from at least one sensor configured to the FCU data collection module, an FCU processor module for processing data from the FCU data collection module and base unit and an FCU transceiver module for transmitting and receiving data between the base unit and the FCU, the base unit including a base unit transceiver module for transmitting and receiving data between the base unit and the FCU, a base unit processor module for processing data from the FCU and a display module for audio or visual display of data.

* * * * *

UNITED STATES PATENT AND TRADEMARK OFFICE
CERTIFICATE OF CORRECTION

PATENT NO.     : 6,481,634 B1  
DATED          : November 19, 2002  
INVENTOR(S)    : Zosimadis

It is certified that error appears in the above-identified patent and that said Letters Patent is hereby corrected as shown below:

<u>Column 14,</u>
Line 45, insert -- FCU -- before the word "processor"

<u>Column 15,</u>
Line 11, delete "How" and insert -- flow --

Signed and Sealed this

Fifteenth Day of April, 2003

JAMES E. ROGAN
*Director of the United States Patent and Trademark Office*